US011639698B1

(12) United States Patent
Schroeder et al.

(10) Patent No.: US 11,639,698 B1
(45) Date of Patent: May 2, 2023

(54) COMPRESSION-IGNITED DUAL LIQUID FUEL SYSTEM AND CONTROL STRATEGY FOR FLEXIBLE FUEL OPERATION

(71) Applicant: Caterpillar Inc., Peoria, IL (US)

(72) Inventors: Eric Lee Schroeder, Germantown Hills, IL (US); Kenth I Svensson, Peoria, IL (US); Richard C Kulaga, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/717,847

(22) Filed: Apr. 11, 2022

(51) Int. Cl.
| | | |
|---|---|---|
| *F02D 41/40* | (2006.01) | |
| *F02D 41/14* | (2006.01) | |
| *F02D 35/02* | (2006.01) | |
| *F02M 43/04* | (2006.01) | |
| *F02D 41/00* | (2006.01) | |

(52) U.S. Cl.
CPC ......... *F02D 41/401* (2013.01); *F02D 35/023* (2013.01); *F02D 41/0025* (2013.01); *F02D 41/1461* (2013.01); *F02D 41/403* (2013.01); *F02M 43/04* (2013.01); *F02D 2250/36* (2013.01)

(58) Field of Classification Search
CPC .. F02D 35/023; F02D 35/024; F02D 41/0025; F02D 41/146; F02D 41/1461; F02D 41/403; F02D 2250/36; F02M 43/04
USPC ........................................ 123/299, 304, 575
See application file for complete search history.

(56) References Cited

U.S. PATENT DOCUMENTS

| | | | | |
|---|---|---|---|---|
| 4,499,861 A | * | 2/1985 | Wiegand | F02M 43/04 123/576 |
| 4,856,713 A | * | 8/1989 | Burnett | F02M 43/04 239/113 |
| 4,958,605 A | * | 9/1990 | O'Neal | F02M 61/042 123/300 |
| 5,647,316 A | * | 7/1997 | Hellen | F02M 43/00 123/25 C |
| 5,758,618 A | * | 6/1998 | Jay | F02B 47/02 123/25 C |
| 5,862,793 A | * | 1/1999 | Jay | F02M 43/04 239/96 |
| 7,225,787 B2 | | 6/2007 | Bromberg et al. | |
| 7,730,872 B2 | | 6/2010 | Leone et al. | |
| 8,068,971 B2 | | 11/2011 | Hamedovic et al. | |
| 8,185,293 B2 | | 5/2012 | Jiang et al. | |
| 8,286,610 B2 | | 10/2012 | Moriya | |
| 8,434,431 B2 | | 5/2013 | Fried et al. | |
| 9,303,610 B2 | * | 4/2016 | Jay | F02D 19/0694 |
| 9,605,635 B2 | * | 3/2017 | Park | F02D 19/0642 |
| 10,167,806 B2 | | 1/2019 | Sumilla et al. | |

(Continued)

*Primary Examiner* — Erick R Solis
(74) *Attorney, Agent, or Firm* — Brannon Sowers & Cracraft PC

(57) ABSTRACT

A dual fuel system includes a liquid pilot fuel supply, a liquid main fuel supply, and a fuel injection apparatus. The dual fuel system further includes a fueling control unit coupled with a cylinder pressure sensor and a NOx sensor, and structured to vary, via outputting a fueling control command to a main fuel injection control valve, fuel delivery parameters each on the basis of at least one of a cylinder pressure parameter or a NOx parameter. The fueling control unit compensates via the varying fuel delivery parameters for a change to a liquid main fuel composition such as a change from a first alcohol fuel or blend to a second alcohol fuel or blend.

20 Claims, 3 Drawing Sheets

(56) References Cited

U.S. PATENT DOCUMENTS

| 1,102,103 | A1 | 6/2021 | Kurtz et al. | |
|---|---|---|---|---|
| 11,024,103 | B2 | 6/2021 | Kurtz | |
| 2015/0020769 | A1* | 1/2015 | Huang | F02B 23/0669 |
| | | | | 123/145 R |

* cited by examiner

US 11,639,698 B1

COMPRESSION-IGNITED DUAL LIQUID FUEL SYSTEM AND CONTROL STRATEGY FOR FLEXIBLE FUEL OPERATION

TECHNICAL FIELD

The present disclosure relates generally to a dual liquid fuel system, and more particularly to compensating for a change to a liquid main fuel composition in the dual liquid fuel system.

BACKGROUND

Internal combustion engines are well-known and widely used globally for vehicle propulsion, electric power generation, and compression and handling of gases and liquids as well as various other industrial applications. In a conventional strategy, fuel and air are combusted within an engine cylinder to produce a rapid rise in pressure and drive a piston coupled with a crankshaft. Spark-ignited and compression-ignited operating strategies are well-known. In recent years, there has been significant research interest in engines and operating strategies that are flexible with regard to fuel utilization. Fuel prices and availability can be dynamic, and various desirable properties from the standpoint of emissions can be realized using certain fuel types, for example liquid alcohol fuels and various blends.

A variety of engine types are known which enable operation on varied fuel types, such as blends of gasoline and alcohol that can vary in relative proportions. Such strategies have been observed to work relatively well for certain engine platforms, including spark-ignited engine platforms known from the automotive field. In some cases, an oxygen (lambda) sensor is used to enable adjustments to fueling when fuel composition is varied. Other strategies achieving flexibility with regard to fuel type employ two entirely different types of fuel for combustion in the engine cylinders, notably combinations of compression-ignition diesel fuel and natural gas that can vary in fuel quality or composition. One example of a dual fuel engine employing a diesel pilot fuel to ignite natural gas is known from U.S. Pat. No. 6,032,617 to Willi et al.

SUMMARY

In one aspect, a dual fuel system includes a liquid pilot fuel supply, a liquid main fuel supply, and a fuel injection apparatus fluidly connected to each of the liquid pilot fuel supply and the liquid main fuel supply. The fuel injection apparatus includes a pilot fuel nozzle check, a pilot fuel injection control valve, a main fuel nozzle check, and a main fuel injection control valve. The dual fuel system further includes a cylinder pressure sensor, a NOx sensor, and a fueling control unit. The fueling control unit is structured to receive a cylinder pressure signal indicative of a cylinder pressure parameter, and to receive a NOx signal indicative of a NOx parameter. The fueling control unit is further structured to vary, via outputting a fueling control command to the main fuel injection control valve, a plurality of fuel delivery parameters each on the basis of at least one of the cylinder pressure parameter or the NOx parameter, and to compensate, via the varying a plurality of fuel delivery parameters, for a change to a liquid main fuel composition in the dual fuel system.

In another aspect, a method of operating a dual fuel engine system includes varying a composition of a liquid main fuel in the dual fuel engine system from a first composition to a second composition, and igniting a liquid main fuel charge of the second composition injected into a cylinder in an engine via compression-ignition of an injected liquid pilot fuel charge injected into the cylinder. The method further includes monitoring cylinder pressure in the cylinder during combustion of the ignited liquid main fuel charge, and determining a control term on the basis of the monitored cylinder pressure. The method still further includes varying a fuel delivery parameter of a subsequent liquid main fuel charge injected into the cylinder on the basis of the determined control term so as to compensate for the varying a composition of a liquid main fuel from a first composition to a second composition.

In still another aspect, a dual liquid fuel control system includes a fueling control unit structured to receive a cylinder pressure signal indicative of a cylinder pressure parameter during combustion of a liquid main fuel compression-ignited during a liquid pilot fuel in an engine, and to receive a NOx signal indicative of a NOx parameter of the engine. The fueling control unit is further structured to vary, via outputting a fueling control command to a main fuel injection control valve, a first liquid main fuel delivery parameter on the basis of the cylinder pressure parameter, and to vary, via the outputting a fueling control command to the main fuel injection control valve, a second liquid main fuel delivery parameter on the basis of the NOx production parameter. The fueling control unit is further structured to vary, via outputting a fueling control command to a pilot fuel injection control valve, a liquid pilot fuel delivery parameter.

DETAILED DESCRIPTION

Figure 1:
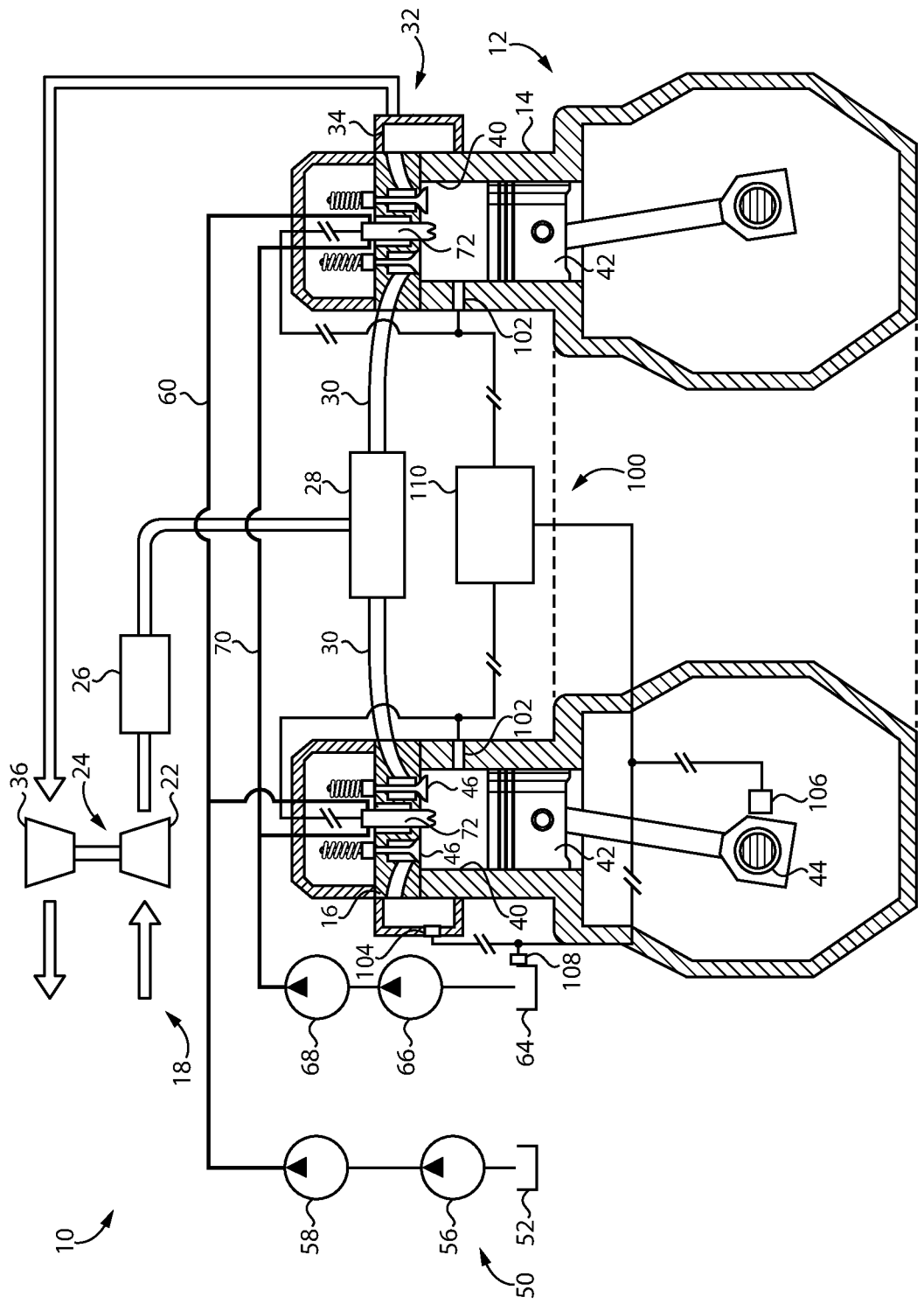
FIG. 1 is a diagrammatic view of a dual fuel internal combustion engine system, according to one embodiment.

Referring to FIG. 1, there is shown a dual fuel internal combustion engine system 10, according to one embodiment. Engine system 10 includes an engine 12 having a cylinder block 14 and a cylinder head 16 attached to cylinder block 14. Engine system 10 also includes an intake system 18 structured to feed intake air for combustion to engine 12 and having a compressor 22 in a turbocharger 24 providing a feed of compressed intake air to an intake manifold 28 by way of an aftercooler 26. A plurality of intake runners 30 extend from intake manifold 28 to cylinder head 16 to provide feeds of intake air to a plurality of combustion cylinders 40 formed in cylinder block 14. Combustion cylinders 40 can include any number of cylinders in any suitable arrangement such as an in-line pattern, a V-pattern, or still another. Engine system 10 also includes an exhaust system 32 having an exhaust manifold 34 structured to feed exhaust from cylinders 40 to a turbine 36 of turbocharger 24 in a generally conventional manner. A plurality of pistons 42 are positioned within cylinders 40 and movable in a generally known manner between a top-dead-center position and a bottom-dead-center position, typically in a conventional four-stroke cycle. Engine valves 46 are supported in cylinder head 16 and movable to open and close fluid communications between cylinders 40 and intake manifold 28 and exhaust manifold 34 also in a generally conventional manner. Pistons 42 are coupled to a crankshaft 44 rotatable to power a load such as an electrical generator, a pump, a compressor, or a driveline in a land vehicle or marine vessel, to name a few examples.

Engine system 10 further includes a dual fuel system 50. Dual fuel system 50 includes a liquid pilot fuel supply or tank 54 and a liquid main fuel supply or tank 64. Dual fuel system 50 also includes a low-pressure pump 56 operable to feed a liquid pilot fuel from tank 54 to a high-pressure pump 58. High-pressure pump 58 pressurizes a liquid pilot fuel to an injection pressure and feeds the same to a common pressurized fuel reservoir or rail 60. Dual fuel system 50 also includes a low-pressure pump 66 operable to feed a liquid main fuel to a high-pressure pump 68. High-pressure pump 68 pressurizes a liquid main fuel to an injection pressure and feeds the same to a common reservoir or rail 70. A fuel injection apparatus 72 is associated with each one of cylinders 40 in engine 12 and fluidly connected to each of liquid pilot fuel supply 54 and liquid main fuel supply 64. In the illustrated embodiment common pressurized reservoirs 60 and 70 containing a liquid pilot fuel and a liquid main fuel, respectively, are provided. In other instances cam-actuated or hydraulically-actuated pistons could be used in each fuel injection apparatus to pressurize fuel to an injection pressure, or used to pressurize fuel to an injection pressure for some, but less than all, of the fuel injection apparatuses provided in dual fuel system 50.

Liquid pilot fuel supply 54 may contain a suitable higher cetane number fuel, such as a diesel distillate fuel, various blends, or a fuel that includes a cetane enhancer. Liquid main fuel supply 64 may contain a lower cetane number fuel such as an alcohol fuel, a gasoline-and-alcohol fuel blend, or still another. In one implementation liquid main fuel supply 64 contains methanol (MeOH), a blend of alcohol and gasoline such as E85, or any of a variety of other fuels and fuel blends. Engine system 10 may be operated by igniting a liquid main fuel charge directly injected into cylinder 40 via compression-ignition of a directly injected liquid pilot fuel charge, as further discussed herein.

Various lower cetane fuels and blends, for example renewable methanol, ethanol, ethanol-and-gasoline blends such as E85, can vary in availability and/or cost. In some instances, the composition of fuels, such as a relative proportion of alcohol therein, that are available can vary as well or even be unknown. Many engine platforms are designed around predictability in the composition of fuel that is to be used based on different properties of the fuel when combusted. For instance, relatively large swings in power output as well as emissions production profile can be observed when fuel composition is changed in an engine. Factors including but not limited to injection pressure, injection amount, and injection timing may need to be varied to compensate for changes in fuel composition. For these and other reasons fuel system and control system designs can be limited in their capacity for optimum operation. Compounding these difficulties, it is often desirable to refill a fuel tank before the tank is entirely empty, causing further variability that has frustrated prior efforts to optimally operate engines flexibly with regard to fuel composition. As will be further apparent from the following description, engine system 10 is uniquely configured to compensate for a change to a liquid main fuel composition in dual fuel system 50. "Compensating" in this sense includes, but is not necessarily limited to, maintaining a requested engine power output and maintaining emissions compliance, such as with regard to oxides of nitrogen or "NOx" and particulate matter.

Figure 2:
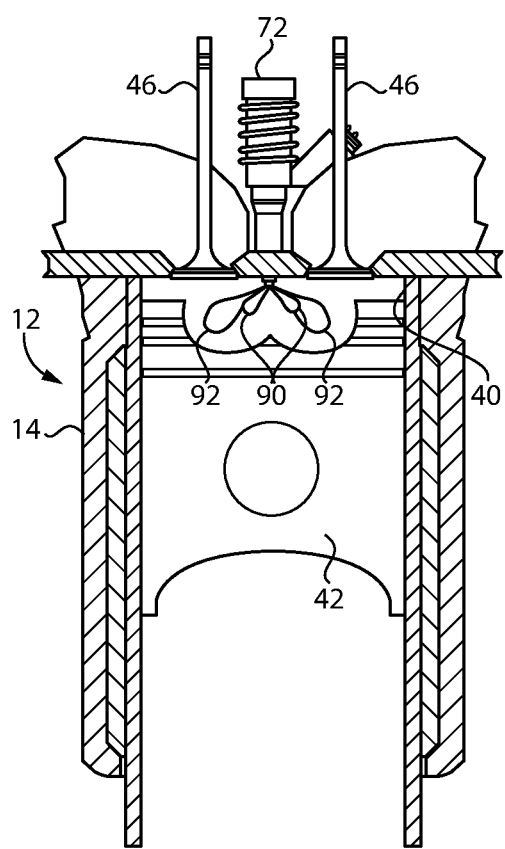
FIG. 2 is a sectioned diagrammatic view of a portion of a dual fuel engine system, according to one embodiment.
Figure 3:
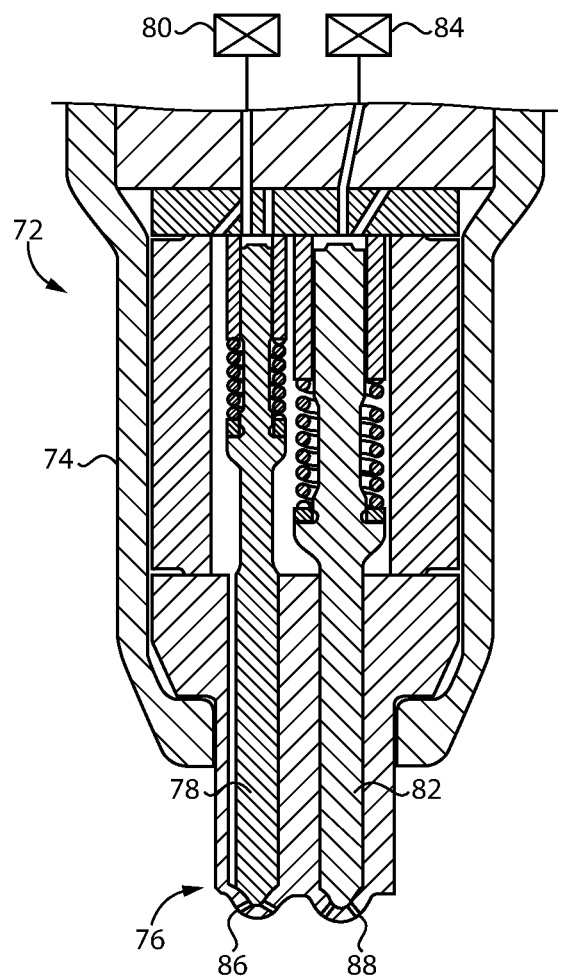
FIG. 3 is a sectioned view of a portion of a fuel injection apparatus, according to one embodiment.

Referring also now to FIGS. 2 and 3, fuel injection apparatus 72 is fluidly connected to each of liquid pilot fuel supply 54 and liquid main fuel supply 64 as noted above, and includes an injector housing 74 having therein a directly controlled pilot fuel nozzle check 78 and an electrically actuated pilot fuel injection control valve 80. Fuel injection apparatus 72 also includes within injector housing 74 a directly controlled main fuel nozzle check 82, and an electrically actuated main fuel injection control valve 84. Control valves 80 and 84 may be solenoid operated. Injector housing 74 includes a nozzle 76 having formed therein a first outlet set 86 including a plurality of fuel spray outlets that are opened and closed by way of actuating pilot fuel nozzle check 78, and a second outlet set 88 including a plurality of fuel spray outlets opened and closed by way of actuating main fuel nozzle check 82. Those skilled in the art will be familiar with direct hydraulic control that enables opening and closing pilot fuel nozzle check 78 and main fuel nozzle check 82 by way of pilot fuel injection control valve 80 and main fuel injection control valve 84, respectively. In brief, injection control valves 80 and 84 can be energized to relieve a closing hydraulic pressure on a closing hydraulic surface of the respective nozzle checks 78 and 82, and deenergized to restore the closing hydraulic pressure.

As can be seen from FIG. 2 each of outlet sets 86 and 88 sprays a plurality of spray plumes into cylinder 40 including pilot plumes 90 of a relatively small amount of liquid pilot fuel and main plumes 92 of a relatively larger amount of liquid main fuel. Outlet sets 86 and 88 can be arranged such that the respective plumes 90 and 92 are mostly or entirely non-intersecting when sprayed into cylinder 40. The plurality of outlets in each respective outlet set 86 and 88 can include any number, such as a number from 3 to 9, and at any suitable spray angle such as a spray angle between 100° and 150°. While fuel injection apparatus 72 is shown as a single fuel injector with side-by-side nozzle checks, in other embodiments two separate fuel injectors having separate nozzles could be used. Still other instances might employ dual concentric checks instead of side-by-side checks, or a single check injecting a segmented fuel charge of leading pilot fuel and trailing main fuel via the same fuel passage.

Dual fuel system 50 further includes a dual liquid fuel control system 100. Control system 100 includes cylinder pressure sensors 102 within or exposed to a fluid pressure of each cylinder 40, and a NOx sensor 104. NOx sensor 104 may be positioned in exhaust manifold 34, or downstream from exhaust manifold 34 in exhaust system 32. Control system 100 may also include an engine speed sensor 106, and a tank sensor 108. Engine speed sensor 106 may be structured, such as by monitoring crankshaft 44 or another rotatable element having a known speed of rotation relative to crankshaft 44, to monitor engine speed. Tank sensor 108 may be coupled to or associated with liquid main fuel supply 64. Tank sensor 108 can be operable to monitor a level, a change in level, or otherwise some parameter having a known or determinable relationship to whether fuel appears to have been added, or is being added, to liquid main fuel supply 64, the significance of which will be further apparent from the following description. Any sensor or sensor group employing physical or chemical sensing to detect addition of main fuel, or a change in composition of a main fuel, in dual fuel system 50 can be used according to the present disclosure, as further discussed herein.

Figure 4:
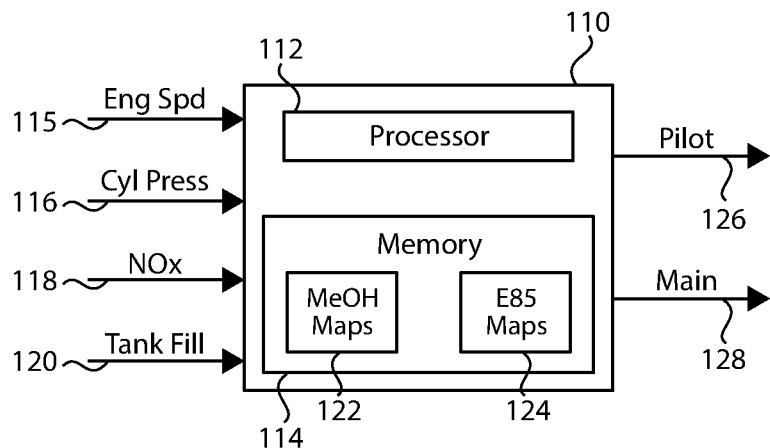
FIG. 4 is a functional block diagram of a fueling control unit, according to one embodiment.

Referring also now to FIG. 4, control system 100 further includes a fueling control unit 110. Fueling control unit 110 is coupled with cylinder pressure sensor(s) 102, NOx sensor 104, engine speed sensor 106, and tank sensor 108, as well as potentially other sensors used for various purposes in engine system 10 including so-called virtual sensors. Fueling control unit 110 includes a processor 112, which may be any suitable programmable logic unit such as a microprocessor, a microcontroller, or still another, and a computer readable memory 114. Computer readable memory 114 may include any suitable volatile or non-volatile memory, such as RAM, ROM, SDRAM, EPROM, FLASH, or still another. Memory 114 may store program control instructions for operating control system 100 and engine system 10 consistent with the purposes of the present disclosure, as well as various maps. In the illustrated embodiment memory 114 stores one or more MeOH maps 122 and one or more E85 maps 124. Processor 112 may be structured to determine via lookups from maps 122 and 124 fueling control commands, such as timing, duration, and magnitude, of electrical control currents, outputted to pilot fuel injection control valve 80 and main fuel injection control valve 84, as further discussed herein.

Fueling control unit 110 may be structured to receive a cylinder pressure signal 116 indicative of a cylinder pressure parameter in cylinder 40. The cylinder pressure parameter may be a peak cylinder pressure, an instantaneous cylinder pressure such as for populating a cylinder pressure history, or another cylinder pressure parameter. Fueling control unit 110 may further be structured to receive a NOx signal 118 indicative of a NOx parameter. The NOx parameter may be a NOx content in exhaust, or may be indicative of a NOx content in exhaust from engine 12. Fueling control unit 110 may be further structured to receive an engine speed signal 115, and a tank fill signal 120 from engine speed sensor 106 and tank sensor 108, respectively. Fueling control unit 110 may also be structured to vary, via outputting a fueling control command to main fuel injection control valve 84, a plurality of fuel delivery parameters each varied from one engine cycle to another on the basis of at least one of the cylinder pressure parameter or the NOx parameter. Fueling control unit 110 is also structured to compensate, via the varying a plurality of fuel delivery parameters, for a change to a liquid main fuel composition in dual fuel system 50.

As noted above, different fuel types and fuel blend ratios can often require different fuel delivery parameters to achieve optimal operation. For example, operating on MeOH may require a relatively earlier or advanced fuel injection timing of at least one, and typically both, of a liquid pilot fuel charge and a liquid main fuel charge as compared to E85 if NOx production targets are to be satisfied. Moreover, if MeOH and E85 are mixed at an unknown proportion in a fuel tank the optimal injection timing might be somewhere between injection timings for MeOH and E85. In addition to injection timing, factors relating to fuel injection amounts such as fuel injection pressure and fuel injection duration can also desirably differ depending upon which fuel or fuel blend ratio is in or supplied to dual fuel system 50. Directionally a fuel blend composition relatively higher in ethanol versus gasoline might require a larger fuel injection amount than a fuel composition relatively lower in ethanol versus gasoline. A fuel delivery parameter as contemplated herein includes a timing of fuel delivery, including a start of injection timing, an end of injection timing, or both, as well as an injection duration, an injection rate, an injection pressure, or an injection rate shape. Still other fuel delivery parameters could include the use of or the number of pilot shots of liquid pilot fuel, for example. Those skilled in the art will envision still other fuel delivery parameters that might be varied depending upon the composition of liquid main fuel that is used. It is contemplated that one or more fuel delivery parameters might be adjusted based upon a NOx signal and NOx parameter whereas one or more others might be adjusted based upon a cylinder pressure signal, or still others adjusted on the basis of both a NOx signal/parameter and cylinder pressure signal/parameter, if optimum power output and emissions production is to be achieved. In an implementation, fueling control unit 110 is structured to vary, via the outputting a fueling control command, a main fuel injection amount on the basis of the cylinder pressure parameter indicated by cylinder pressure signal 116. In a refinement, fueling control unit 110 is further structured to determine a control term, such as a numerical control term, based on the cylinder pressure parameter. The control term may be an indicated mean effective pressure (IMEP) over the course of one or more engine cycles. Based on the IMEP fueling control unit 110 may further calculate a lower heating value control term which is indicative of the fuel type or fuel blend (the liquid main fuel composition) that is being used. Based upon the determined lower heating value fueling control unit 110 can access an appropriate one of the stored maps on memory 114 for determining fueling control commands. Where MeOH and E85, or other fuels, are blended in liquid main fuel supply 64, for example, processor 112 could interpolate between the respective maps to determine or cause an appropriate fuel injection amount. Thus, fueling control unit 110 varies, via the outputting a fueling control command, at least a main fuel injection amount on the basis of the control term.

Fueling control unit 110 may be further structured to vary, via the outputting a fueling control command, a main fuel injection timing on the basis of the NOx parameter indicated by the NOx signal. Analogous to fuel injection amount, fuel injection timings can be determined via map lookups and, as appropriate, interpolation. Embodiments are thus contemplated where a main fuel injection amount is determined on the basis of the cylinder pressure parameter, and a main fuel injection timing on the basis of the NOx parameter. A main fuel injection control command is shown in FIG. 4 at 128. Fueling control unit 110 may also be structured to vary, via outputting a fueling control command to pilot fuel injection control valve 80, a pilot fuel injection timing on the basis of the NOx parameter. In FIG. 4 a pilot fueling control command is shown at 126. In still other instances, the main fuel delivery timing may be varied on the basis of both the NOx parameter and the cylinder pressure parameter.

In a typical implementation, control system 100 can be understood as continuously or periodically monitoring cylinder pressure in each cylinder 40 as well as NOx production from typically all of the cylinders 40. The main fueling control command 128 and the pilot fueling control command 126 may be outputted during each engine cycle to cause fuel injection apparatus 72 to perform as desired to inject a relatively small liquid pilot fuel charge that is compression-ignited to ignite a relatively large liquid main fuel charge. When switching fuel type or fuel blend a significant change in energy content of the fuel could cause engine 12 to produce too much power or too little power. Accordingly, it may be desirable in some instances to determine at least main fueling control command 128 according to a relatively faster timescale to avoid swings in power output. On the other hand, it may be less feasible to rapidly or instantaneously respond to transient changes in NOx production due to the slower response time of NOx sensors in the exhaust stream. Accordingly, varying main fuel injection timing and typically also pilot fuel injection timing may be performed on a different timescale, typically a slower timescale. It is contemplated that fueling control unit 110 may perform a relatively fast loop calculation to correct on power output, based on cylinder pressure, and a relatively slower loop calculation to correct on NOx. Those skilled in the art will envision a great many different extensions and alternatives to this basic strategy of splitting and/or distributing fuel injection amount, timing, and potentially other fuel delivery parameters between or among control targets relating to cylinder pressure (IMEP) and NOx production.

INDUSTRIAL APPLICABILITY

Figure 5:
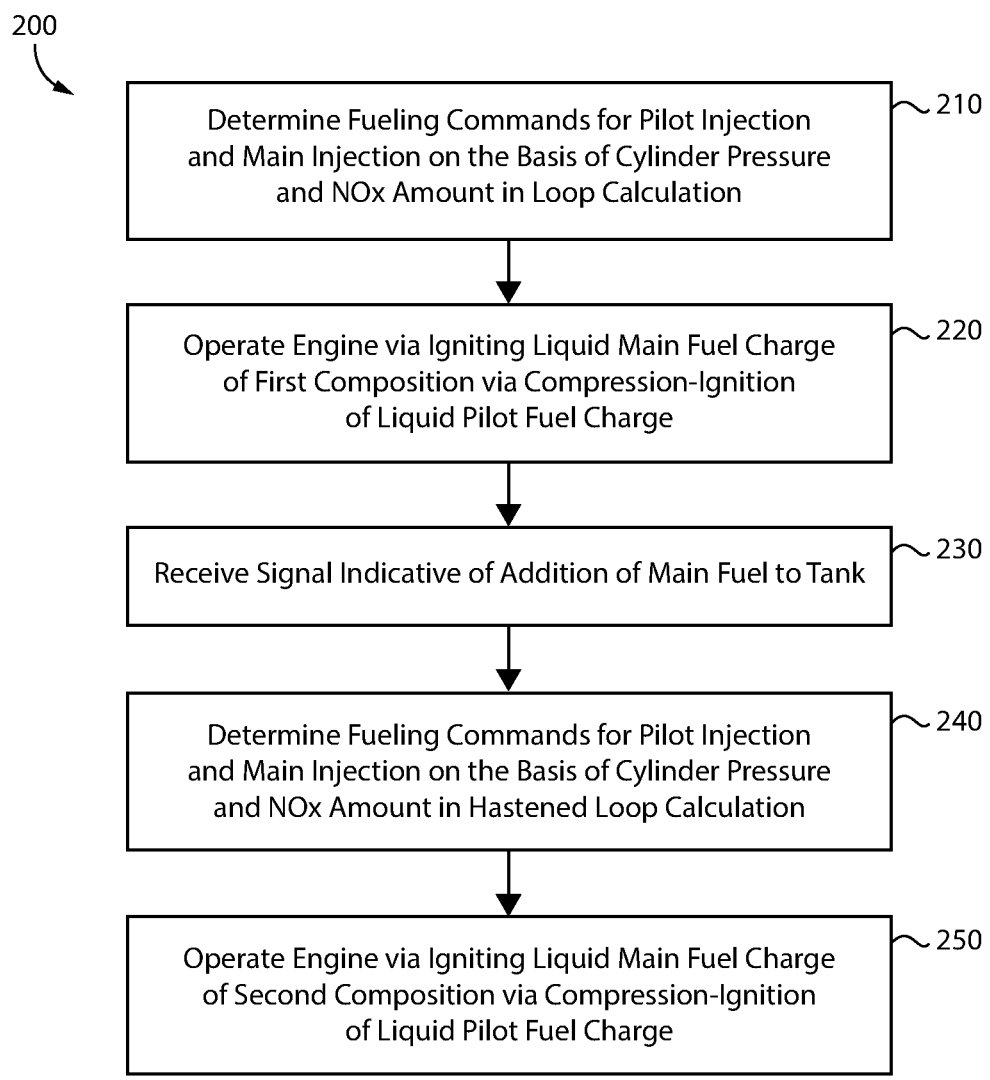
FIG. 5 is a flowchart illustrating example methodology and logic flow, according to one embodiment.

Referring to the drawings generally, but focusing also now on FIG. 5, there is shown a flowchart 200 illustrating example methodology and logic flow, according to one embodiment. As noted above one implementation of the present disclosure is contemplated to be in a marine vessel or other mobile vehicle. When fuel is added to liquid main fuel supply 64, tank sensor 108 can provide an indication that fuel has been added indicating that changes to fuel delivery parameters may be desirable to compensate for a changed fuel composition. As discussed above, fueling control unit 110 may be calculating an integrated heat release into cylinders in the engine, in turn used to calculate a lower heating value of the fuel or fuel blend. This calculation may be filtered such that a delay is imposed on adjustments to fuel delivery parameters. The filtering may move faster, hastening a loop calculation for determining the fueling control command, based on a determined addition of a main liquid fuel to the liquid main fuel supply 64. In this way, when a jump in tank level is detected indicating a refill event, fuel delivery parameters can be relatively quickly adjusted to compensate for the varying composition of a liquid main fuel from a first composition to a second composition.

In flowchart 200, at a block 210 fueling commands for pilot injection and main injection are determined on the basis of cylinder pressure and NOx amount in a loop calculation. From block 210 flowchart 200 advances to a block 220 to operate engine 12 via igniting a liquid main fuel charge of a first composition via compression-ignition of a liquid pilot fuel charge. From block 220 flowchart 200 advances to a block 230 to receive a signal indicative of addition of main fuel to the tank. From block 230 flowchart 200 advances to a block 240 to determine fueling commands for pilot injection and main injection on the basis of cylinder pressure and NOx amount in a hastened loop calculation, as discussed herein. From block 240 flowchart 200 advances to a block 250 to operate engine 12 via igniting a liquid main fuel charge of a second composition via compression-ignition of liquid pilot fuel charge.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A dual fuel system comprising:
   a liquid pilot fuel supply;
   a liquid main fuel supply;
   a fuel injection apparatus fluidly connected to each of the liquid pilot fuel supply and the liquid main fuel supply and including a pilot fuel nozzle check, a pilot fuel injection control valve, a main fuel nozzle check, and a main fuel injection control valve;
   a cylinder pressure sensor;
   a NOx sensor;
   a fueling control unit structured to:
      receive a cylinder pressure signal indicative of a cylinder pressure parameter;
      receive a NOx signal indicative of a NOx parameter;
      vary, via outputting a fueling control command to the main fuel injection control valve, a plurality of fuel delivery parameters each on the basis of at least one of the cylinder pressure parameter or the NOx parameter; and
      compensate, via the varying a plurality of fuel delivery parameters, for a change to a liquid main fuel composition in the dual fuel system.

2. The dual fuel system of claim 1 wherein the fueling control unit is further structured to determine a control term based on the cylinder pressure parameter.

3. The dual fuel system of claim 2 wherein the fueling control unit is further structured to vary, via the outputting a fueling control command, a main fuel injection amount on the basis of the control term.

4. The dual fuel system of claim 3 wherein the control term includes a lower heating value.

5. The dual fuel system of claim 1 wherein the fueling control unit is further structured to vary, via the outputting a fueling control command, a main fuel injection amount on the basis of the cylinder pressure parameter, and a main fuel injection timing on the basis of the NOx parameter.

6. The dual fuel system of claim 5 wherein the fueling control unit is further structured to vary, via outputting a fueling control command to the pilot fuel injection control valve, a pilot fuel injection timing on the basis of the NOx parameter.

7. The dual fuel system of claim 5 wherein the fueling control unit is further structured to vary, via the outputting a fueling control command, the main fuel injection timing on the basis of both the NOx parameter and the cylinder pressure parameter.

8. The dual fuel system of claim 5 wherein the fueling control unit is further structured to vary the main fuel injection amount and the main fuel injection timing on different timescales.

9. The dual fuel system of claim 1 further comprising a fuel tank sensor structured to detect addition of a main liquid fuel to the liquid main fuel supply, and the fueling control unit is further structured to hasten a loop calculation for determining the fueling control command based on the detected addition of a main liquid fuel to the liquid main fuel supply.

10. A method of operating a dual fuel engine system comprising:
    varying a composition of a liquid main fuel in the dual fuel engine system from a first composition to a second composition;

igniting a liquid main fuel charge of the second composition injected into a cylinder in an engine via compression-ignition of an injected liquid pilot fuel charge injected into the cylinder;

monitoring cylinder pressure in the cylinder during combustion of the ignited liquid main fuel charge;

determining a control term on the basis of the monitored cylinder pressure; and varying a fuel delivery parameter of a subsequent liquid main fuel charge injected into the cylinder on the basis of the determined control term so as to compensate for the varying a composition of a liquid main fuel from a first composition to a second composition.

11. The method of claim 10 wherein at least one of the first composition or the second composition of the liquid main fuel includes alcohol or gasoline.

12. The method of claim 10 wherein the determining a control term includes calculating an indicated mean effective pressure (IMEP) on the basis of the monitored cylinder pressure, and calculating a lower heating value control term of the liquid main fuel on the basis of the IMEP.

13. The method of claim 12 wherein the varying a fuel delivery parameter includes varying a fuel injection amount.

14. The method of claim 10 further comprising monitoring a NOx parameter, and varying a different fuel delivery parameter of the subsequent liquid main fuel charge on the basis of the monitored NOx parameter.

15. The method of claim 14 wherein the different fuel delivery parameter includes a fuel injection timing.

16. The method of claim 14 wherein the varying a fuel delivery parameter and the varying a different fuel delivery parameter occur on different timescales.

17. The method of claim 10 further comprising hastening a loop calculation determining a fueling control command to vary the fuel delivery parameter on the basis of the varying a composition of a liquid main fuel.

18. A dual liquid fuel control system comprising:
a fueling control unit structured to:
receive a cylinder pressure signal indicative of a cylinder pressure parameter during combustion of a liquid main fuel compression-ignited via a liquid pilot fuel in an engine;
receive a NOx signal indicative of a NOx parameter of the engine;
vary, via outputting a fueling control command to a main fuel injection control valve, a first liquid main fuel delivery parameter on the basis of the cylinder pressure parameter;
vary, via the outputting a fueling control command to the main fuel injection control valve, a second liquid main fuel delivery parameter on the basis of the NOx parameter; and
vary, via outputting a fueling control command to a pilot fuel injection control valve, a liquid pilot fuel delivery parameter.

19. The control system of claim 18 wherein the first liquid main fuel delivery parameter includes a liquid main fuel injection amount, and the second liquid main fuel delivery parameter includes a liquid main fuel injection timing.

20. The control system of claim 19 wherein the fueling control unit is further structured to determine a lower heating value of the liquid main fuel on the basis of the cylinder pressure parameter, and to determine the fueling control command to the main fuel injection control valve on the basis of the determined lower heating value.

* * * * *